Nov. 18, 1958

J. BELSKY 2,860,736

CARTRIDGE ACTUATED BRAKES

Filed Jan. 18, 1956

Jerome Belsky
INVENTOR.

BY *(signatures)*
Attorneys

United States Patent Office 2,860,736
Patented Nov. 18, 1958

2,860,736

CARTRIDGE ACTUATED BRAKES

Jerome Belsky, Falls Church, Va., assignor to Talco Engineering Co., Inc., Hamden, Conn., a corporation of Connecticut Application January 18, 1956, Serial No. 559,975

4 Claims. (Cl. 188—106)

This invention relates to multiple actuators for brakes and more particularly to an emergency braking device adapted to be utilized in combination with the pneumatic or hydraulic brakes usually provided on vehicles.

The primary object of the present invention resides in the provision of an emergency brake actuating mechanism for actuating or setting brakes in the event of failure of the operating mechanism normally provided therefor.

In tractor-trailer vehicles which are usually provided with air brakes or the like, there is the possibility of failures occuring. The failure of the brake mechanism of these and other vehicles may occur from loss of pressure, or for various other reasons due to leaks, broken connections or the like. The present invention provides an emergency mechanism for operating the vehicle brakes thus functioning in combination with the normal brake operating mechanism to form a combined multiple actuator for the brakes.

The construction of the present invention accommodates a propellant cartridge which when ignited provides sufficient pressure by the gases of combustion to force a piston to carry the push rod of the conventional brake operating cylinder of air brakes or the like to a brake actuating position.

Still further objects and features of this invention reside in the provision of multiple actuators for brakes which are adapted to be associated with each of the brake assemblies in a convenient manner, which are simple in construction and inexpensive to install, which are adapted to quickly and positively bring a vehicle to a standstill without loss of time required in other types of emergency brake apparatus employing valves and the like, and which is substantially foolproof in operation.

These, together with the various ancillary objects and features of the invention which will become apparent as the following description proceeds, are attained by the cartridge actuated brakes, preferred embodiments of which have been illustrated in the accompanying drawings, by way of example only, wherein.

Figures 1, 2:
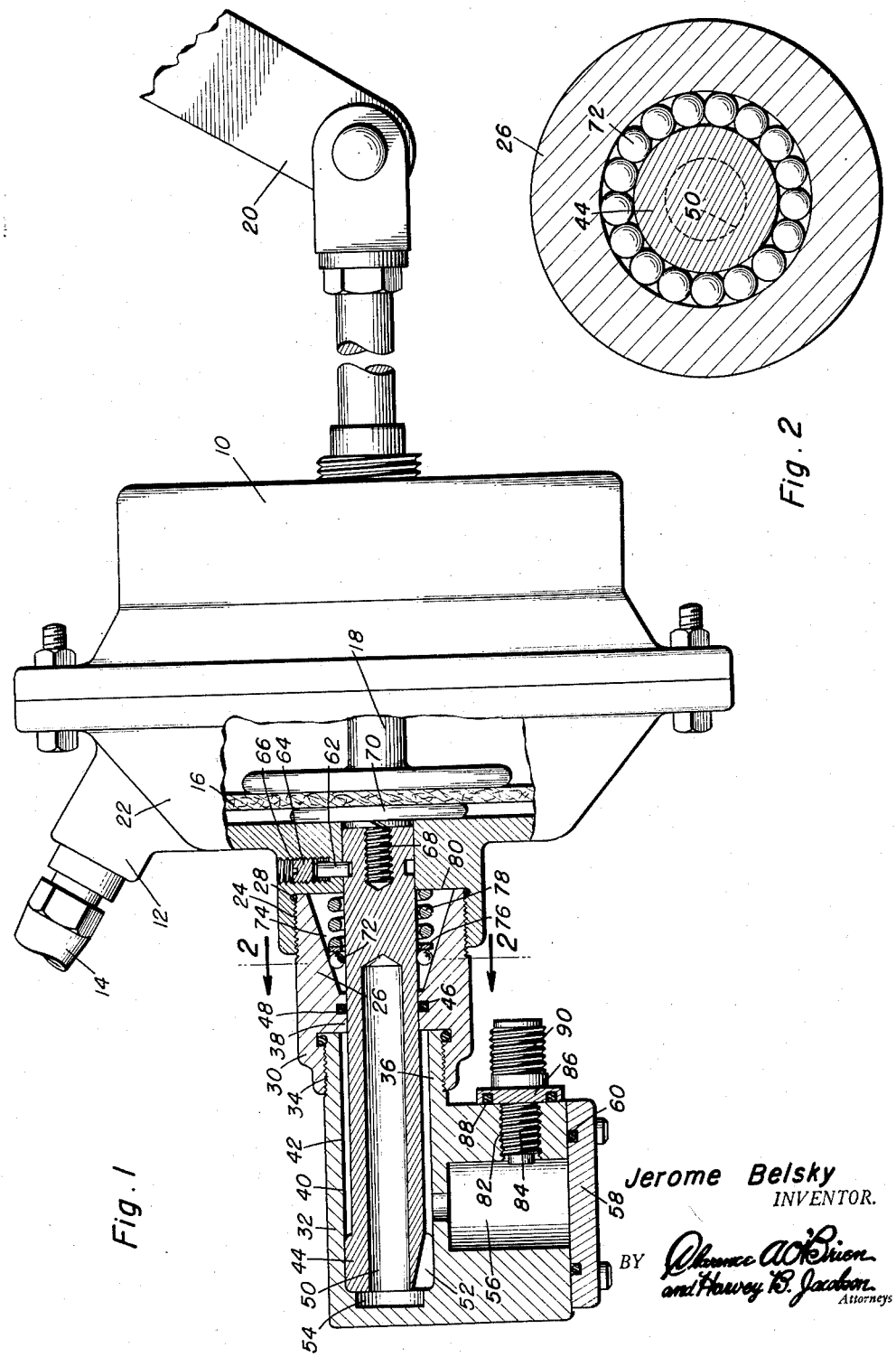
Figure 1 is a sectional detail view of the cartridge actuated emergency brake mechanism shown in conjunction with the push rod and brake operating system of a pneumatic brake.
Figure 2 is an enlarged sectional detail view as taken along the plane of line 2—2 in Figure 1 showing an optional lock for the piston which may be utilized in conjunction with the invention.

A brake operating cylinder 10 is shown with air inlet 12 connected to a conduit 14 through which air under pressure can be applied to cause the diaphragm 16 to flex carrying the push rod 18 therewith. As the push rod 18 is actuated it functions to operate the arm 20 connected to the brake shoes, or other similar elements.

The brake operating cylinder 10 is provided with a special head casting 22 which has an internally threaded recess 24 into which a housing 26 is threadedly secured. A seal 28 may be provided as is necessary. The housing 26 may be formed in sections including sections 30 and 32. The section 30 may be internally threaded as at 34 for receiving the externally threaded portion 36 of the section 32. The sections 30 and 32 have aligned bores 38 and 40 therein forming a chamber 42 for receiving a piston 44. A suitable O ring 46 is mounted in a recess communicating with the bore as at 48 and provides a seal. The piston 44 is provided with a cavity as at 50 therein and is slotted as at 52 to allow communication between the end portion 54 of the chamber 42 and the expansion chamber 56 also provided in the housing section 32 which expansion chamber 56 is closed by an end plate 58. An O ring seal 60 is provided between end plate 58 and a surface of section 32.

Lockingly holding the piston 44 in position is a ductile shear pin 62 held in place by a set screw 64 threadedly secured in a threaded recess 66 in the casting 22. Threadedly secured by means of a stud 68 to the end of the piston 44 is a piston end plate 70 which engages the diaphragm 16 of the brake operating cylinder 10.

If desired, locking means for holding the piston in an extended position may be provided and may include a series of spherical locking detents or members 72 which are positioned within the tapered recess 74 in the housing section 30. A washer 76 engaging the ball and a spring 78 yieldingly engages and biases the washer 76 and the shoulder 80 formed by the recess 24 in the casting 22.

Suitably secured in a threaded opening 82 in the housing section 32 is a cartridge 84 containing a propellant substance which when ignited will burn to provide propellant gases under considerable pressure. A plate 86 may be secured in any convenient manner in overlying relationship relative to the cartridge 84 or may form a part thereof, and a seal 88 comprising an O ring may be utilized. An igniter 90 which may be electrically actuated or may be of any convenient and conventional construction may be connected to the cartridge 84 in a conventional manner.

In operation, upon actuation of the igniter 90, the cartridge 84 will be ignited and the exhaust gases thereof will pass into the chamber 56, and upon expansion, will pass into the end portion 54 of the chamber 42 through the slot 52. This pressure will then be exerted upon the frontal surface of the piston 44 and will cause the piston to move thereby causing the diaphragm 16 to flex and actuate the push rod 18 in a similar manner as the push rod 18 would be actuated should air pressure be passed through the conduit 14.

The foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention as claimed.

What is claimed as new is as follows:

1. In an emergency brake actuation device for use in combination with a brake operating cylinder having a push rod actuated thereby, said device comprising a housing having a chamber, said chamber receiving a piston therein, said piston being connected to said push rod, a cartridge carried by said housing communicating with said chamber, said cartridge containing a propellant which when ignited generates energy to move said piston relative to said chamber, means connected to said cartridge for igniting said cartridge, said housing being threadedly detachably secured to said brake operating cylinder, said brake operating cylinder having an internally threaded recess threadedly receiving an externally threaded end portion of said housing, said recess forming a shoulder, a tapered cavity in said threaded end portion of said housing, said piston extending through said cavity, a series of locking spheres and a washer in said cavity, and spring means resiliently engaging said shoulder and said washer urging said locking spheres into locking engagement with said housing and said piston.

2. An emergency brake actuation device for use in combination with a brake operating cylinder having a push rod actuated thereby, said device comprising a housing having a chamber, said chamber receiving a piston therein, said piston being connected to said push rod, a cartridge carried by said housing and communicating with said chamber, said cartridge containing a propellant which when ignited generates energy to move said piston relative to said chamber, means connected to said cartridge for igniting said cartridge, said housing being threadedly detachably secured to said brake operating cylinder, and a shear pin for holding said piston in said housing until after ignition of said cartridge.

3. An emergency brake actuation device for use in combination with a brake operating cylinder having a push rod actuated thereby, said device comprising a housing having a chamber, said chamber receiving a piston therein, said piston being connected to said push rod, a cartridge carried by said housing communicating with said chamber, said cartridge containing a propellant which when ignited generates energy to move said piston relative to said chamber, means connected to said cartridge for igniting said cartridge, said housing being threadedly detachably secured to said brake operating cylinder, said brake operating cylinder having an internally threaded recess threadedly receiving an externally threaded end portion of said housing, said recess forming a shoulder, a tapered cavity in said threaded end portion of said housing, said piston extending through said cavity, a series of locking spheres and a washer in said cavity, spring means resiliently engaging said shoulder and said washer urging said locking spheres into locking engagement with said housing and said piston, and a shear pin for holding said piston in said housing until after ignition of said cartridge.

4. An emergency brake actuation device for use in combination with a brake operating cylinder having a push rod actuated thereby, said device comprising a housing having a chamber, a piston in said chamber, said piston connected to said push rod, a cartridge carried by said housing and communicating with said chamber, said cartridge containing a propellant which when ignited generates energy to move said piston relative to said chamber, means connected to said cartridge for igniting said cartridge, said housing being threadedly detachably secured to said brake operating cylinder, said brake operating cylinder having an internally threaded recess threadedly receiving an externally threaded end portion of said housing, said recess forming a shoulder, a tapered cavity in said threaded end portion of said housing, said piston extending through said cavity, a series of locking spheres and a washer in said cavity, spring means resiliently engaging said shoulder and said washer urging said locking spheres into locking engagement with said housing and said piston, and said housing having an expansion chamber therein between said cartridge and said first recited chamber.

References Cited in the file of this patent

UNITED STATES PATENTS

| | | |
|---|---|---|
| 1,444,984 | Simmon | Feb. 13, 1923 |
| 2,674,852 | Olman | Apr. 13, 1954 |
| 2,726,738 | Fawick | Dec. 13, 1955 |